United States Patent [19]

Zampini et al.

[11] Patent Number: 4,652,283

[45] Date of Patent: Mar. 24, 1987

[54] POLYPHENYLENE OXIDE MEMBRANE HAVING CHEMICALLY BONDED COATING

[75] Inventors: Anthony Zampini, St. Louis; Raymond F. Malon, Edmundson, both of Mo.

[73] Assignee: Monsanto Company, St. Louis, Mo.

[21] Appl. No.: 509,633

[22] Filed: Jun. 30, 1983

[51] Int. Cl.$^4$ .............................................. B01D 53/22
[52] U.S. Cl. ......................................... 55/158; 55/16; 55/68
[58] Field of Search ........................... 55/16, 68, 158; 210/500.2

[56] References Cited

U.S. PATENT DOCUMENTS

| | | | |
|---|---|---|---|
| 3,767,737 | 10/1973 | Lundstrom | 55/158 X |
| 3,945,926 | 3/1976 | Kesting | 210/500.2 |
| 3,980,456 | 9/1976 | Browall | 55/158 |
| 4,073,754 | 2/1978 | Cabasso et al. | 210/500.2 X |
| 4,120,098 | 10/1978 | Manos | 55/16 X |
| 4,157,960 | 6/1979 | Chang et al. | 55/158 X |
| 4,172,885 | 10/1979 | Perry | 55/16 X |
| 4,180,552 | 12/1979 | Graham et al. | 55/16 X |
| 4,180,553 | 12/1979 | Null et al. | 55/16 X |
| 4,181,675 | 1/1980 | Makin et al. | 55/16 X |
| 4,220,535 | 9/1980 | Leonard | 55/158 X |
| 4,286,015 | 8/1981 | Yoshida et al. | 210/500.2 X |
| 4,421,529 | 12/1983 | Revak et al. | 55/16 |
| 4,427,419 | 1/1984 | Li | 55/16 |

*Primary Examiner*—Robert Spitzer
*Attorney, Agent, or Firm*—H. Croskell

[57] ABSTRACT

A coated membrane for gas separations wherein the membrane is made up of an amine cross-linked poly(phenylene oxide) substrate membrane having about 1 to about 7 weight percent nitrogen and a coating on the substrate membrane. The coating is a polymer containing groups capable of reacting with amine groups at the surface of the substrate membrane to ionically or covalently bond the coating to the substrate.

17 Claims, No Drawings

POLYPHENYLENE OXIDE MEMBRANE HAVING CHEMICALLY BONDED COATING

BACKGROUND OF THE INVENTION

A. Field of the Invention

This invention relates to gas separation membranes.

B. Prior Art

The separating, including upgrading of the concentration of, at least one gas from a gaseous mixture is an especially important procedure in view of the demands on the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation the membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture.

In order for selective separation of the one or more desired gases by the use of separation membranes to be commercially attractive, the membranes must satisfy several criteria so that the use of the separation procedure is economically attractive. For instance the membranes must be capable of withstanding the conditions to which they may be subjected during the separation operation. The membranes also must provide an adequately selective separation of one or more desired gases at a sufficiently high flux, that is, permeation rate of the permeate gas per unit surface area. Thus, separation membranes which exhibit adequately high selective separation but undesirably low fluxes, may require such large separating membrane surface area that the use of these membranes is not economically feasible. Similarly separation membranes which exhibit a high flux but low selective separation are also commercially unattractive.

Membranes which are not capable of maintaining the desired high flux and selective separation over extended periods of time in adverse operating environments are likewise economically not feasible. Adverse environmental conditions include extremes of temperature, pressure and concentrations of chemical contaminants. Accordingly, work has continued to develop gas separation membranes which can provide both an adequately selective separation of one or more desired gases at a sufficiently high flux for an extended period of time under adverse environmental conditions such that the use of these gas separation membranes is economically feasible.

In general, the passage of a gas through a membrane may proceed through pores, i.e., continuous channels for fluid flow in communication with both feed and exit surfaces of the membrane (which pores may or may not be suitable for separation by Knudsen flow or diffusion); in another mechanism, in accordance with current views of membrane theory the passage of a gas through the membrane may be by interaction of the gas with the material of the membrane. In this latter postulated mechanism, the permeability of a gas through a membrane is believed to involve the solubility of the gas in the membrane material and the diffusion of the gas through the membrane. The permeability constant for a single gas is presently viewed as being the product of the solubility and diffusivity of that gas in the membrane. A given membrane material has a particular permeability constant for passage of a given gas by the interaction of the gas with the material of the membrane. The rate of permeation of the gas, i.e., flux, through the membrane is related to the permeability constant, but is also influenced by variables such as the membrane thickness, the physical nature of the membrane, the partial pressure differential of the permeate gas across the membrane, the temperature of the gas and the like.

It has been generally observed that materials which exhibit good separation of gases often have lower permeability constants compared to those of materials exhibiting poor separation of gases. In general, efforts have been directed to providing the material of a gas separation membrane in as thin a form as possible, in view of the low permeabilities, in order to provide adequate flux yet provide a membrane as pore-free as possible, such that gases are passed through the membrane by interaction with the material of the membrane.

One approach to developing separation membranes suitable for gaseous systems has been to provide composite membranes having a superimposed membrane supported on an anisotropic porous support wherein the superimposed membrane provides the desired separation, i.e., the superimposed membrane is semi-permeable. The superimposed membranes are advantageously sufficiently thin, i.e., ultrathin, to provide reasonable fluxes. The essential function of the porous support is to support and protect the superimposed membrane without harming the delicate, thin superimposed membrane. Suitable supports are desirably porous to provide low resistance to permeate passage after the superimposed membrane has performed its function of selectively separating the permeate from the feed mixture. Klass et.al., U.S. Pat. No. 3,616,607; Stancell et.al., U.S. Pat. No. 3,657,113; Yasuda, U.S. Pat. No. 3,775,303; and Browall, U.S. Pat. No. 3,980,456 exemplify gas separation membranes having superimposed membranes on a porous support.

Such composite membranes for gas separations have not been without problems. For instance, Browall discloses that in the fabrication of composite membranes of ultrathin films fine particles (i.e., particles below about 3000 Angstroms in size) may be deposited under or between preformed ultrathin membrane layers and, because of their large size in comparison to the ultrathin membranes, puncture the ultrathin membranes. Such breaches reduce the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membrane and the porous polycarbonate support as an adhesive. Thus the composite membranes of Browall are complex in materials and techniques of construction.

A major improvement in gas separation membranes is disclosed by Henis et.al. in U.S. Pat. No. 4,230,463 which pertains to particular multicomponent membranes for gas separations comprising a coating in contact with a porous separation membrane wherein the separation properties of the multicomponent membranes are principally determined by the porous separation membrane as opposed to the material of the coating. Such multicomponent membranes for the separation of at least one gas from a gaseous mixture can exhibit a desirable selectivity and still exhibit a useful flux. Moreover, such multicomponent membranes for gas separation can be fabricated from a wide variety of gas separation membrane materials allowing great latitude in selecting such a membrane material which is advantageous for a given gas separation. The desired combinations of flux and selectivity of separation can be provided by the configuration and methods of preparation and combination of the components. However, this membrane suffers the disadvantage that it is easily damaged in the presence of certain contaminant gases frequently found in gas streams.

Despite such advances in gas separation membranes it would be advantageous to construct any membrane, including such multicomponent membranes, from materials that have normally high flux and the desired selectivity of separation but also have stable environmental resistance. That is, the membranes should have high structural strength, toughness, abrasion and chemical resistance to remain functional under extremes of pressure and differential pressure. In this regard such membranes are often required to operate with very high pressure differentials across the membrane.

Depending on the operating environment chemical resistance is also desirable for instance resistance to hydrocarbons, ammonia, water and acid gases such as carbon dioxide and hydrogen sulfide is often required. Such chemicals may have a tendency to dissolve or plasticize the material of gas separation membranes resulting in deterioration of the membrane or densification of an otherwise asymmetric structure.

Polyarylene oxides have been recognized as material of some potential in the membrane separation field. For instance, Robb in U.S. Pat. No. 3,350,844 disclosed that polyarylene oxide membranes, for instance membranes of 2,6-dimethylphenylene oxide membranes, have unique properties such as a high separation factor and flux together with strength and ability to form thin films. Robb further discloses that factors such as temperature, pressure, elongation of oriented membrane material, the amount of crystallinity, among others, in the polyarylene oxide resin, may effect permeability. In this regard polyphenylene oxide resins have a low resistance to most common organic solvents. Aromatic and chlorinated hydrocarbon solvents dissolve polyphenylene oxide polymers, while other solvents and solvent vapors induce crazing in molded polyphenylene oxide parts under stress thus causing almost complete loss of strength.

See also Kimura, U.S. Pat. Nos. 3,709,774; 3,762,136; and 3,852,388 which relate to membranes of polyxylene oxide with the same apparent disadvantages.

An alternative form of polyarylene oxide membranes is disclosed by Salemme in U.S. Pat. No. 3,735,559 where various ionic forms of a sulfonated polyxylylene membrane are disclosed. Among the disadvantages discussed are that it is necessary to preshrink such membranes to avoid rupturing; the hydrogen ion form is unstable and may undergo sulfone formation resulting in cross-linking or may, in the presence of water, undergo hydrolysis with the liberation of sulfuric acid; various counter ion salt forms of the membrane are stable and will avoid detrimental cross-linking but such membranes may densify in the presence of water.

In summary coated suitable polyarylene oxide membranes have not been provided for gas separations which can exhibit sufficient flux and selectivity of separation for general commercial operations in the presence of adverse environmental conditions as the presence of chemical contaminants, extremes of differential pressure and temperature.

SUMMARY OF THE INVENTION

A coated membrane for gas separations wherein the membrane is made up of an amine cross-linked poly(phenylene oxide) substrate membrane having about 1 to about 7 weight percent nitrogen and a coating on the substrate membrane. The coating is a polymer containing groups capable of reacting with amine groups at the surface of the substrate membrane to ionically or covalently bond the coating to the substrate.

DETAILED DESCRIPTION OF THE INVENTION

"Polyarylene or polyphenylene oxide" as used in this application represents a composition of matter having a repeated structural unit of the formula:

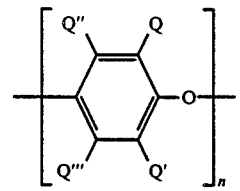

wherein the oxygen atom of one monomeric unit is connected to the benzene nucleus of the adjoining unit; n is a positive integer of at least 100; Q is a monovalent substituent selected from the group consisting of hydrogen, aliphatic hydrocarbon radicals free of a tertiary α-carbon atom, arylhydrocarbon radicals, and hydrocarbonoxy radicals having at least two carbon atoms and being free of an aliphatic tertiary α-carbon atom; Q' is a monovalent substituent which is the same as Q or different and may include halogen; and Q" is the same as Q' or different and in addition may be nitro and sulfono. Q''' is the same as Q" or different.

Preferred polyphenylene or polyarylene oxide has repeated structural units of the formula:

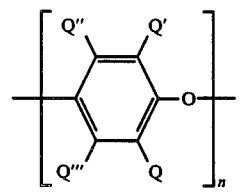

wherein Q is an aliphatic hydrocarbon radical of 1 to 4 carbon atoms; and Q" is a monovalent substituent selected from the group consisting of hydrogen, halogen, nitro, sulfono, aliphatic hydrocarbon radicals having 1 to 4 carbon atoms, and acyl radicals having at least two carbon atoms.

A more preferred polyarylene oxide for the membrane is poly(2,6-dimethyl-1,4-phenylene oxide) and such polymer with 3 and 5 position substituents selected from the group consisting of hydrogen, halogen, nitro, sulfono, aliphatic hydrocarbon radicals having 1 to 4 carbon atoms, and acyl radicals having at least two carbon atoms.

This invention provides gas separation membranes made up of an amine cross-linked polyphenylene oxide hollow fiber substrate and a polymeric semi-permeable coating which is chemically bonded to the hollow fiber substrate. This provides a membrane which, in addition to having good gas separation properties, has a good resistance to aggressive contaminants frequently found in gas streams.

THE SUBSTRATE

The polyarylene oxide precursor which is useful as a cross-linked substrate will generally have at least 0.01 substituents per arylene oxide unit wherein said substituents are selected from the group consisting of halogenated alkyl groups or halogenated acyl groups. Preferably the halogenated alkyl group or halogenated acyl group will have from 1 to 4 carbon atoms. Such halogenated alkyl groups can be, for instance, halomethyl, haloethyl, halopropyl, haloisopropyl, halobutyl or haloisobutyl. The preferred halogens are chlorine or bromine. The most preferred halogen is bromine. The simplest halogenated alkyl group is the halomethyl group where the one carbon alkyl group is generally referred to as a benzylic group.

Among the halogenated acyl groups are the halogenated acetyl, propionyl, including isopropionyl, and buturyl, including isobuturyl. Among the preferred halogens are chlorine and bromine where chlorine is the most preferred halogen. The most preferred halogenated acyl groups include halogenated acetyl and halogenated propionyl for instance chloroacetyl and chloropropionyl.

Among the chemical cross-linking agents used to form covalently bonded cross-linked polymers which are useful for the gas separation membranes of this invention are ammonia and aqueous solutions of ammonium hydroxide. Other useful cross-linking agents comprise compounds selected from the group consisting of primary monoamines, secondarymonoamines, halocyclic nitrogen-containing compounds, primary polyamines and secondary polyamines. Such compounds contain at least one nitrogen atom which is covalently bonded to provide cross-linkage between polyarylene oxide precursors.

The substrate membrane is preferably in the form of a hollow fiber having an outside diameter of about 200 to 1000 microns and a wall thickness of 50 to 300 microns. The polyphenylene oxide substrate membrane is porous, with the pore sizes being greater in the interior of the membrane and lesser near the surfaces of the membrane, such that the membrane is anisotropic.

The porous substrate membrane is made by dissolving the arylene oxide polymer in a solvent such as N-methyl-2-pyrrolidone, formylpiperidine, etc. to form a solution having about 20 to 70 weight percent solids. This solution is then passed through a spinnerette to form a substrate in the form of a hollow fiber. The fiber is washed to remove solvent and then dried. The steps from forming the fiber solution to the drying of the formed hollow fiber membrane are conventional.

The substrate membrane is then exposed to a solution of an amine such as described above to effect cross-linking of the substrate. The exposure to the amine may be at room temperature or at an elevated temperature, depending on the amine. This treatment cross-links the polymeric material of the substrates while leaving reactive amine groups at the surface of the substrate for reaction with the coating to be applied.

THE COATING

Inasmuch as the porous substrate membrane may well have pores extending from surface to surface, it is necessary to apply a thin coating or layer to the surface of the substrate membrane to cover any openings or pores in this surface. Without such a coating, the pores in the substrate membrane may render this membrane useless for separation of one gas from a mixture. One of the major disadvantages of coatings applied to porous substrate membranes, such as that disclosed in U.S. Pat. No. 4,230,463, is that the coating may be destroyed or its effectiveness substantially reduced in the presence of certain contaminants. Examples of contaminants which are detrimental to such a coated membrane are aliphatic hydrocarbons such as hexane; aromatics such as benzene and toluene; methanol; ammonia and hydrogen sulfide. The multicomponent membrane of this invention is substantially immune to such contaminants.

The coating is a polymer containing reactive groups capable of reacting with amine groups in the polymer of the substrate membrane at the surface of the substrate membrane to ionically or covalently cross-link the coating to the substrate. Preferably, the coating is poly(phenylene oxide), a benzyl halogenated aryl polymer or a silicone polymer having epoxy, chloropropyl or isocyanato functional groups.

More particularly, the preferred coating is a poly(phenylene oxide) polymer having as a substituent a reactive monovalent radical such as $-SO_3H$, $-COCH_2Cl$, $CH_2Br$ or $CH_2Cl$ or is a silicone polymer containing epoxy, chloropropyl or isocyanato functional groups. The coating may be applied to the cross-linked substrate membranes by dipping these membranes in a solution of the coating, the solution being made of 0.05 to 20 weight percent of the polymer dissolved in a suitable solvent. After being dipped in the solution the fibers are withdrawn from the solution and dried. The drying may be carried out at room temperature or at an elevated temperature.

When the coating is applied to the substrate membrane, the reactive groups in the coating will chemically bond to the amine groups on the cross-linked substrate membrane to ionically or covalently bond the coating to the substrate. This bonding renders the membrane substantially immune to aggressive contaminants frequently found in gas streams.

After the coating has been chemically bonded to the substrate the membrane will contain about 1 to about 7 weight percent nitrogen. Preferably, the amount of nitrogen added to the substrate during the cross-linking step will be such that there will be 2.5 to 3.8 weight percent of nitrogen in the membrane.

A number of tests were made, using both cross-linked and non cross-linked substrates, with different coatings. Permeabilities and separation factors of both the substrate alone and the coated substrate were determined in a conventional manner. The results are shown in Table I.

Permeabilities are expressed as cubic centimeters (STP) per square centimeter of membrane area per second per differential partial pressure of 1 centimeter of mercury across the membrane thickness $cm^3(STP)/cm^2$-sec-cmHg. Unless otherwise noted, all permeabilities are reported herein at standard temperatures and pressures of 60° F. and 14.7 psia, respectively. The permeabilities are reported in gas permeation units (GPU), which are $cm^3(STP)/cm^2$-sec-cmHg$\times 10^{-6}$; thus 1 GPU is $1\times 10^6 cm^3(STP)/cm^2$-sec-cmHg.

Another convenient relationship for expressing gas permeation characteristics of a membrane is separation factor. A separation factor, $\alpha a/b$, for a membrane for a given pair of gases "a" and "b" is defined as the ratio of the permeability, $(P_a/l)$, of a membrane of thickness "l" for a gas "a" of a gas mixture to the permeability, $(P_b/l)$, of the same membrane to gas "b" of the mixture.

TABLE I
COATINGS FOR CROSS-LINKED MEMBRANES

| Example | Substrate Fiber | Substrate Cross-Linking Treatment | Uncoated Substrate $(P/l)H_2 \times 10^6$ | $\alpha\,H_2/CH_4$ | Coating | Coated Properties $(P/l)H_2 \times 10^6$ | $(P/l)CO_2 \times 10^6$ | $\alpha\,H_2/CH_4$ | $\alpha\,CO_2/CH_4$ |
|---|---|---|---|---|---|---|---|---|---|
| 1 | A | None | 141 | 5.8 | a | 106 | 44 | 42 | 17 |
| 2 | A | 24 hr, 30% NH$_4$OH at 60° C. | 109 | 48 | a | 121 | 43 | 65 | 29 |
| 3 | A | Same | 108 | 44 | b | 59 | 19 | 130 | 40 |
| 4 | A | None | 65 | 2 | c | 59 | 18 | 5 | 1 |
| 5 | B | None | 85 | 6 | c | 123 | 44 | 3 | 1 |
| 6 | A | 24 hr, 30% NH$_4$OH at 23° C. | 125 | 35 | a | 109 | 33 | 79 | 25 |
| 7 | A | Same | 129 | 16 | d | 78 | 22 | 59 | 20 |

Fiber A = brominated poly(phenylene oxide)
Fiber B = polysulfone
Coating a = 1% solution of 100 parts dimethyl siloxane diol and 10 parts of aminopropyltriethoxysilane, with 2 parts of dibutyltin dilaurate as a catalyst, in pentane
Coating b = 0.5 weight percent sulfonated poly(phenylene oxide) in methanol
Coating c = 1 weight percent sulfonated poly(phenylene oxide) in methanol
Coating d = 0.6 weight percent methyl brominated poly(phenylene oxide) in carbon tetrachloride In Example 4 no cross-linking treatment was applied to the substrate, so that there were no reactive sites for chemically bonding the coating to the substrate. In Example 5, the coating is not bonded to the substrate. Examples 3 and 7, where the substrate polymer is cross-linked and the coating is chemically bonded to the substrate, show higher gas permeation characteristics than do most of the other examples.

EXAMPLE 8

A substrate membrane was formed from a poly(phenlyene oxide) polymer as defined herein. The permeability of the substrate membrane for hydrogen and carbon dioxide was determined in a conventional manner. Separation factors of the membrane for hydrogen versus methane and carbon dioxide versus methane were also determined. These values are given in Table II.

TABLE II

| $P/lH_2 \times 10^6$ | $P/l/CO_2 \times 10^6$ | $\alpha^{H_2}_{CH_4}$ | $\alpha^{CO_2}_{CH_4}$ |
|---|---|---|---|
| 167 | 50 | 12 | 4.3 |

The substrate membrane was then exposed to ammonia to cross-link the substrate. The cross-linked substrate was then dipped twice, at 10 seconds per dip, in a 0.5 weight percent solution of a poly(phenylene oxide) polymer in toluene. The coating polymer had 0.53 chloroacetyl groups per monomeric unit. The coated membrane was then heated to 150° C. for one hour to chemically bond the coating to the substrate. The finished membrane had the permeation characteristics shown in Table III.

TABLE III

| $P/lH_2 \times 10^6$ | $P/l/CO_2 \times 10^6$ | $\alpha^{H_2}_{CH_4}$ | $\alpha^{CO_2}_{CH_4}$ |
|---|---|---|---|
| 111 | 38 | 69 | 30 |

EXAMPLES 9-12

A substrate membrane made from a poly(phenylene oxide) polymer as described herein had, prior to cross-linking, a permeability for hydrogen of $344 \times 10^{-6}$ and a separation factor for hydrogen over carbon monoxide of 3.5. The substrate was then cross-linked by exposure to ammonia.

The cross-linked substrate was then dipped in a 1 weight percent of a coating polymer in pentane and, after being so dipped, was dried for two hours at 75° C. The coating was made up of 100 parts of dimethyl siloxane diol having a molecular weight of about 100,000, 2 parts of dibutyltin dilaurate as a catalyst, and 10 parts of various silanes having isocyanato, chloropropyl and epoxy group capable of reacting with the amine groups of the substrate polymer to chemically bond the coating to the substrate. Permeation characteristics of the resulting multicomponent membrane are given in Table IV.

TABLE IV

| Example | Silane | $P/lH_2 \times 10^6$ | $\alpha^H_{CO}$ |
|---|---|---|---|
| 9 | ≡SiCH$_2$CH$_2$CH$_2$NCO | 125 | 35 |
| 10 | ≡SiCH$_2$CH$_2$CH$_2$Cl | 112 | 32 |
| 11 | ≡SiCH$_2$CH$_2$CH$_2$OCH$_2$CHCH$_2$ (epoxy) | 92 | 37 |
| 12 | ≡SiCH$_2$CH$_2$-(phenyl-O) | 96 | 43 |

In addition to having epoxy, chloropropyl or isocyanato groups capable of reacting with the amine groups on the substrate the above silanes have three methoxy, ethoxy or acetoxy groups (not shown) attached to the silicone atom, so that these silanes react with the siloxane diol coating to cross-link this coating.

1 to 20 parts of these silanes per 100 parts of siloxane diol may be used.

We claim:

1. A coated membrane for gas separations, comprising
   a. a cross-linked poly(phenylene oxide) polymer substrate membrane containing about 1 to about 7 weight percent nitrogen, and
   b. a coating on the substrate membrane, said coating being a polymer having groups capable of reacting with the amine groups in the polymer of the substrate membrane to ionically bond the coating to the substrate, said coating being ionically bonded to said substrate.

2. The membrane of claim 1 wherein the coating polymer is a sulfonated poly(phenylene oxide) polymer.

3. The membrane of claim 2 wherein the coating polymer is a poly(phenylene oxide) polymer having —SO$_3$H groups as a substituent.

4. The membrane of claim 2 wherein the polymer of the substrate membrane is poly(2,6-dimethyl-1,4-phenylene oxide).

5. The membrane of claim 4 wherein the polymer aryl groups have 3 and 5 positions linked to substituents selected from the group consisting of hydrogen, halogen, nitro, aliphatic hydrocarbons having 1 to 4 carbon atoms and acyl radicals having at least two carbon atoms.

6. The membrane of claim 1 wherein the coating is made up of 100 parts of dimethyl siloxane diol and 1 to 20 parts of a silicone compound containing epoxy, chloropropyl or isocyanato functional groups.

7. The membrane of claim 6 wherein the silicone compound is selected from the group consisting of glycidoxypropyl trimethoxy silane, chloropropyl trimethoxysilane, isocyanatopropyl triethoxysilane and 3,4-epoxycyclohexyl ethyl trimethoxy silane.

8. A coated membrane for gas separations, comprising
   a. a cross-linked poly(phenylene oxide) polymer substrate membrane containing about 1 to about 7 weight percent nitrogen, and
   b. a coating on the substrate membrane, said coating being a polymer having groups capable of reacting with the amine groups in the polymer of the substrate membrane to covalently bond the coating to the substrate, said coating being covalently bonded to said substrate.

9. The membrane of claim 8 wherein the coating polymer is selected from the group consisting of a chloroacetylated poly(phenylene oxide) polymer, a benzyl halogenated aryl polymer and a silicone compound having epoxy, chloropropyl or isocyanato functional groups.

10. The membrane of claim 9 wherein the coating is a poly(phenylene oxide) polymer having —COCH$_2$Cl groups as a substituent.

11. The membrane of claim 9 wherein the coating is a poly(phenylene oxide) polymer having bromine as a substituent.

12. The membrane of claim 9 wherein the coating is a poly(phenylene oxide) polymer having chlorine as a substituent.

13. The membrane of claim 9 wherein the polymer of the substrate membrane has at least 0.01 substituent per monomeric unit of a halogenated alkyl or acyl of from 1 to 4 carbon atoms.

14. The membrane of claim 9 wherein the polymer of the substrate membrane is poly(2,6-dimethyl-1,4-phenylene oxide).

15. The membrane of claim 14 wherein the 3 and 5 positions of the aryl group are linked to substituents selected from the group consisting of hydrogen, halogen, nitro, aliphatic hydrocarbon radicals having 1 to 4 carbon atoms and acyl radicals having at least two carbon atoms.

16. The membrane of claim 8 wherein the coating is made up of 100 parts of dimethyl siloxane diol and 1 to 20 parts of a silicone compound containing epoxy, chloropropyl or isocyanato functional groups.

17. The membrane of claim 16 wherein the silicone compound is selected from the group consisting of glycidoxypropyl trimethoxy silane, chloropropyl trimethoxysilane, isocyanatopropyl triethoxysilane and 3,4-epoxycyclohexyl ethyl trimethoxy silane.

* * * * *